United States Patent
Li

(10) Patent No.: US 11,655,438 B2
(45) Date of Patent: May 23, 2023

(54) CRYSTAL MALT AND METHODS FOR FORMING CRYSTAL MALT

(71) Applicant: Yin Li, New Berlin, WI (US)

(72) Inventor: Yin Li, New Berlin, WI (US)

(73) Assignee: Malteurop North America Inc., West Allis, WI (US)

( * ) Notice: Subject to any disclaimer, the term of this patent is extended or adjusted under 35 U.S.C. 154(b) by 330 days.

(21) Appl. No.: 16/859,259

(22) Filed: Apr. 27, 2020

(65) Prior Publication Data

US 2020/0347328 A1    Nov. 5, 2020

Related U.S. Application Data

(60) Provisional application No. 62/992,397, filed on Mar. 20, 2020, provisional application No. 62/914,815, filed on Oct. 14, 2019, provisional application No. 62/841,025, filed on Apr. 30, 2019.

(51) Int. Cl.
| | |
|---|---|
| *C12C 1/18* | (2006.01) |
| *C12C 1/027* | (2006.01) |
| *C12C 1/02* | (2006.01) |
| *C12C 1/067* | (2006.01) |

(52) U.S. Cl.
CPC ............. *C12C 1/18* (2013.01); *C12C 1/02* (2013.01); *C12C 1/027* (2013.01); *C12C 1/067* (2013.01)

(58) Field of Classification Search
CPC .. C12C 1/18; C12C 1/02; C12C 1/027; C12C 1/067; A23L 7/20
USPC .......................................................... 426/241
See application file for complete search history.

(56) References Cited

U.S. PATENT DOCUMENTS

| | | | |
|---|---|---|---|
| 5,405,624 | A | 4/1995 | Doncheck et al. |
| 5,637,336 | A | 6/1997 | Kannenberg et al. |
| 6,449,872 | B1 | 9/2002 | Olkku et al. |
| 2005/0142261 | A1 | 6/2005 | Cheong |

FOREIGN PATENT DOCUMENTS

| | | |
|---|---|---|
| CN | 106 221 979 A | 12/2016 |
| CN | 109 082 347 A | 12/2018 |
| DE | 14 17 568 A1 | 1/1969 |
| DE | 3007143 A1 | 9/1981 |
| DE | 4428978 A1 | 3/1995 |
| EP | 1772513 A1 | 4/2007 |

(Continued)

OTHER PUBLICATIONS

Akkarachaneeyakorn, S. et al. J. Food Sci. 75: 201-207 (Year: 2010).*

(Continued)

*Primary Examiner* — Hamid R Badr
(74) *Attorney, Agent, or Firm* — Reinhart Boerner Van Deuren P.C.

(57) ABSTRACT

A process of producing crystal malt in which a batch of malted grain or germinated malt having a first moisture content is provided. The batch is heated by mircowaving or steaming such that at least 85% of the batch saccharifies. During heating, the first moisture content is reduced to a second moisture content. Embodiments of a batch of crystal malt are also provided. The batch of crystal malt includes at least 90% crystallized malt kernels. Further, the batch of crystal malt contains less than 50 ppb of 4-methylimidazole (4-MeI).

29 Claims, 8 Drawing Sheets

(56) References Cited

FOREIGN PATENT DOCUMENTS

KR   10-2017-0032750 A    3/2017
WO   WO 2008/156051 A1    12/2008

OTHER PUBLICATIONS

CN—106221979A—English Abstract (Year: 2016).*
Akkarachaneeyakorn, S. et al., "Optimization of combined microwave-hot air roasting of malt based on energy consumption and neo-formed contaminants content." Journal of Food Science, 2010, vol. 75, No. 4, pp. E201-E207.

* cited by examiner

CRYSTAL MALT AND METHODS FOR FORMING CRYSTAL MALT

CROSS-REFERENCE TO RELATED PATENT APPLICATIONS

This patent application claims the benefit of U.S. Provisional Patent Application No. 62/841,025, filed Apr. 30, 2019, U.S. Provisional Patent Application No. 62/914,815, filed Oct. 14, 2019, and U.S. Provisional Patent Application No. 62/992,397, filed Mar. 20, 2020, the entire teachings and disclosure of which are incorporated herein by reference thereto.

FIELD OF THE INVENTION

This invention generally relates to highly crystallized malt and a method of producing same and, in particular, to a method of microwaving malt to achieve a crystallization rate of at least 85%.

BACKGROUND OF THE INVENTION

During the process of brewing, malted grains are utilized as fermentable material. According to the conventional process, malting a grain involves germinating the grain by soaking it in water and then drying the germinated grain in a kiln. While germinating, the grain produces natural enzymes that break down the starch in the grain into simpler sugars, which provide a sweet flavor and which are used by the brewing yeast during fermentation to produce alcohol. The amount of starch converted to sugar during germination and drying is described by the percentage crystallized. Conventionally, malted barley, for example, only has a crystallization rate of about 50% to 60% after germination and roasting or drying.

Crystal malts can also be produced in a roaster instead of a kiln. However, roasters have a lower throughput than a kiln, which creates low yields. Additionally, the roaster roasts the grain at a temperature higher than what the malt is exposed to during kiln drying. The reactions that occur in the grain at these temperatures may produce 4-methylimidazole, which has recently be classified as a possible carcinogen.

Thus, conventional methods of producing crystal malts are limited in that they produce low yields (batch size or crystallization rate) and may contain harmful compounds. In view of such limitations, Applicant has recognized a need in the art for a new method of producing crystal malts that have higher crystallization rates without the production of harmful compounds. These and other advantages of the invention, as well as additional inventive features, will be apparent from the description of the invention provided herein.

BRIEF SUMMARY OF THE INVENTION

According to a first aspect, embodiments of the present disclosure relate to a process of producing crystal malt in which a batch of germinated malt having a first moisture content is provided. The batch of germinated malt is microwaved such that at least 85% of the batch of germinated malt saccharifies. During microwaving, the first moisture content is reduced to a second moisture content.

In embodiments, the first moisture content may be from 40% to 50% by weight and the second moisture content is from 15% to 25% by weight.

Further, in embodiments, the method also includes a step of drying the batch of germinated malt so as to reduce the second moisture content to a third moisture content. In such embodiments, the third moisture content may be from 3.0% to 6.0% by weight. In certain embodiments, the step of drying may be performed in a kiln. Further, in certain embodiments, the step of drying may be performed at a temperature of 65° C. to 140° C. for a period of 2 hours to 20 hours.

In embodiments, the step of microwaving may be performed for a time of 2 minutes to 20 minutes. Further, in embodiments, the step of microwaving comprises exposing the batch of germinated malt to microwave radiation having a frequency of 915 MHz to 2450 MHz. Additionally, in embodiments, during the step of microwaving, the batch of germinated malt may reach a temperature of 65° C. to 68° C.

In some embodiments, the process may also include a step of cooling the batch of germinated malt after microwaving to allow the saccharified batch of germinated malt to crystallize. In embodiments, upon completion of the step of microwaving, at least 95% of the batch of germinated malt saccharifies. Additionally, in embodiments, upon completion of the step of microwaving, less than 1% of the batch of germinated malt still contains flour. In particular embodiments, the batch of germinated malt contains less than 50 ppb of 4-methylimidazole. Specifically, in embodiments, the batch of germinated malt has no detectable levels of 4-methylimidazole when analyzed using liquid chromatography-mass spectrometry.

In embodiments, the batch of germinated malt produces a wort having a beta-glucan level of at most 200 ppm. Further, in embodiments, the batch of germinated malt produces a wort having a color in the range of 5 to 32 SRM.

In certain exemplary embodiments, the batch of germinated malt comprises a variety of barley.

Further, in embodiments, the batch of germinated malt has, on average, a single grain hardness of at most 100 as measured according to SKCS 4100.

According to another aspect, embodiments of the present disclosure relate to a batch of crystal malt. The batch of crystal malt includes at least 90% crystallized malt kernels. Further, the batch of crystal malt contains less than 50 ppb of 4-methylimidazole (4-MeI).

In embodiments, the batch of crystal malt produces a wort having a beta-glucan level of at most 200 ppm. Further, in embodiments, the batch of crystal malt produces a wort having a color in the range of 5 to 32 SRM.

In some embodiments, the batch of crystal malt has, on average, a single grain hardness of at most 100 as measured according to SKCS 4100. Additionally, in embodiments, the batch of crystal malt has no detectable level of 4-methylimidazole when analyzed using liquid chromatography-mass spectrometry. Further, in embodiments, for a flavor profile considering flavors of malty, nutty, sweet, biscuity, astringent, bready, smokey, sour, grainy, and toast, the most noticeable flavor is at least one of malty, sweet, bready, or biscuity. In embodiments, the crystal malt is a variety of barley.

According to still another aspect, embodiments of the present disclosure relate to a method of producing crystal malt. In the method, a batch of malted grain is provided. The batch of malted grain is steeped such that the steeped batch of malted grain has a first moisture content. Further, the batch of malted grain is heated such that at least 85% of the batch of malted grain saccharifies. During heating, the first moisture content is reduced to a second moisture content. In embodiments, heating is done by microwaving or by steaming the batch of malted grain.

In still yet another aspect, embodiments of the present disclosure relate to a process of producing crystal malt in which a batch is provided. The batch includes germinated malt or malted grain having a first moisture content. The batch is heated such that at least 85% of the batch saccharifies, and during heating, the first moisture content is reduced to a second moisture content. In embodiments, heating can involve microwaving or steaming.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring generally to the figures, embodiments of a highly crystallized, malted grain and a method of producing same are disclosed herein. Embodiments of the highly crystallized malt have a crystallization of at least 90% and, in some cases, up to 100%. The malted grains are produced according to a method in which a microwaving step is added between steps of germination and kiln drying. Advantageously, the microwaving step substantially increases the crystallinity of the germinated ("green") grain and provides the ancillary benefit of reducing the time for kiln drying. Thus, embodiments of the malted grains produced according to the present disclosure have a higher crystallinity (i.e., sugar content), which means less malted grain is required during the brewing process, and the malting process can be completed in less time, which reduces energy costs associated with the malting process. Additionally, Applicants have unexpectedly found that the malted grain contains no detectable amount of 4-methylimidazole (4-MeI), which has recently be investigated for its potential carcinogenic activity. These and other aspects and advantages of the malted grain and method of production will be discussed in greater detail below. The embodiments discussed and depicted herein are presented by way of illustration and not by way of limitation.

Figures 1, 7:
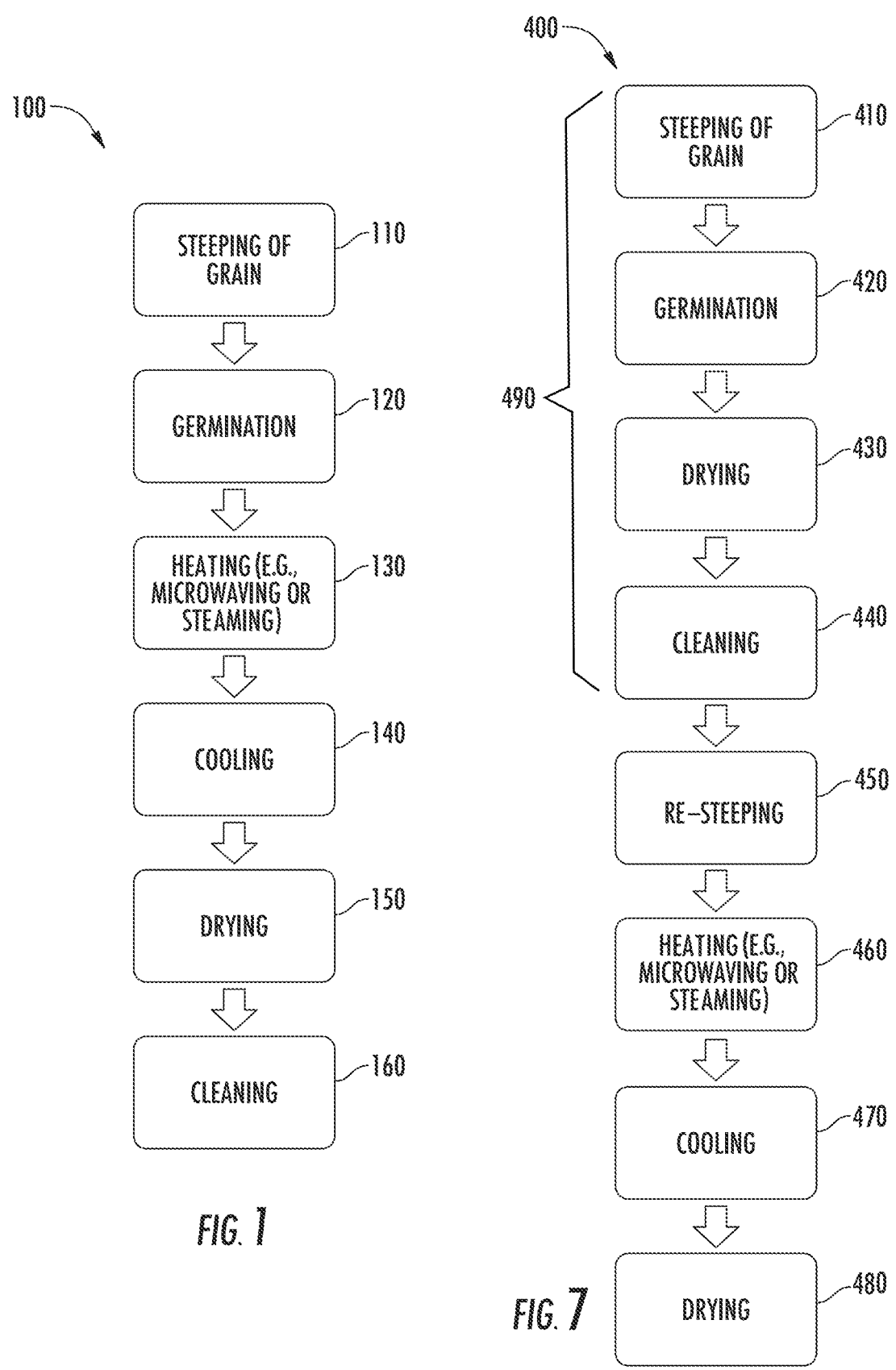
FIG. 1 is a flow diagram of a method of producing crystal malt, according to an exemplary embodiment.
FIG. 7 depicts a flow diagram of another method of producing crystal malt involving two steeping and drying steps, according to an exemplary embodiment.

FIG. 1 provides a flow diagram of a malting process 100 according to an exemplary embodiment. The malting process 100 begins by steeping 110 the grain. The grain may be any of a variety of maltable grains, such as barley, wheat, corn, rice, rye, or oat, among others. During the step of steeping 110, the grain is soaked in a vat with water for about 30 to 40 hours. Chaff and other waste materials may be removed from the vat at this time. After steeping 110, the grain proceeds to a step of germinating 120. During the step of germinating 120, the grain produces sprouts, which activates an enzyme that allows the starches in the grain to convert to sugar. The step of germinating 120 takes approximately 4 days. The germinated "green" grain remains wet from the steeping process. In embodiments, the moisture content of the green malt is between 40% and 50% by weight, more particularly between 45% and 48% by weight.

According to the presently disclosed method, the wet green malt undergoes a step of heating 130 after germinating 120 to saccharify the kernel of the green malt, i.e., to catalyze the enzymes to convert the starches of the green malt to sugars. While the process utilizes a step of heating 130 to achieve saccharification, the moisture content of the malt is also reduced during heating 130.

In embodiments, heating 130 can be performed by microwaving or steaming the green malt. In embodiments in which the wet green malt is microwaved, the moisture content of the wet green malt is reduced from 40%-50% by weight to 15%-25% by weight, more particularly to 18%-22% by weight. That is, in embodiments, the moisture content of the green malt is reduced by 12%-35% by weight, more particularly by 15%-26% by weight.

Figure 2:
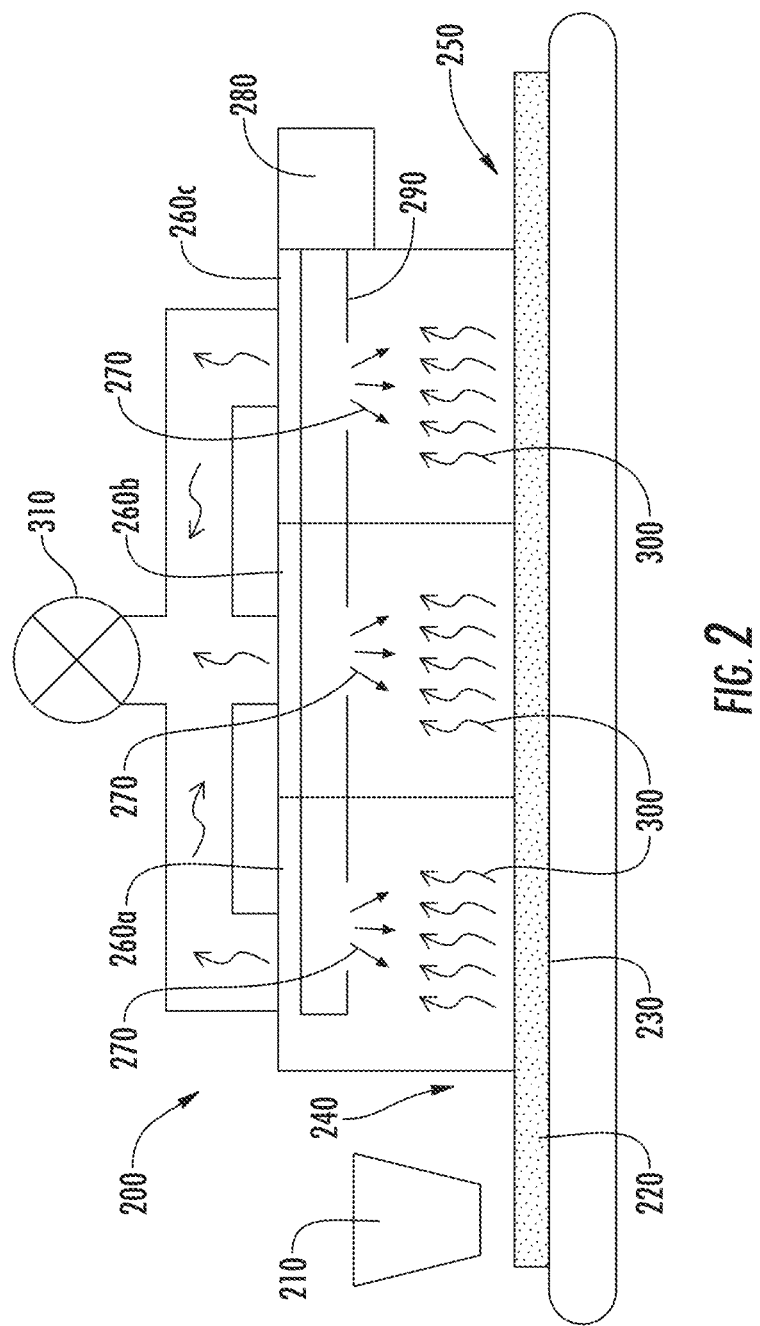
FIG. 2 depicts a microwave tunnel usable in the method for producing crystal malt, according to an exemplary embodiment.

In embodiments, heating 130 by microwaving is performed in a microwave tunnel as shown in FIG. 2. The microwave tunnel 200 has a hopper 210 through which wet green malt 220 is loaded onto a conveyor belt 230. The conveyor belt 230 transports the green malt 220 along the length L of the microwave tunnel 200 from a first end 240 to a second end 250 and through a plurality of microwave zones 260a, 260b, 260c. In embodiments, the microwave tunnel 200 has a length L of from about 10 m to about 15 m, and the width of the microwave tunnel 200 is from about 0.5 m to about 1 m. In the microwave zones 260a, 260b, 260c, the green malt is exposed to microwave radiation 270 that is produced by a magnetron 280 and that is carried to each zone 260a, 260b, 260c by a waveguide 290. While three microwave zones 260a, 260b, 260c are depicted in FIG. 2, the microwave tunnel 200 may contain fewer or a greater number of microwave zones and different dimensions.

The microwave radiation 270 has a frequency of 915 MHz to 2450 MHz. In the microwave tunnel 200, the microwave frequency is set by the magnetron 280. In preferred embodiments, the magnetron 280 produces microwaves having a frequency of 915 MHz. Further, in embodiments, the magnetron 280 has a power of up to 75 kW. In embodiments, the green malt is exposed to the microwave radiation 270 for a time of 2 minutes to 20 minutes, more preferably for a time of 3 minutes to 6 minutes. During microwaving 130, the green malt is raised to a temperature of 65° C. to 68° C., which is the temperature range over which saccharification occurs. Further, as shown schematically in FIG. 2, the microwave radiation 270 causes moisture 300 to evaporate from the wet green malt 220. Thus, in embodiments, the microwave tunnel 200 may be provided with a dehumidifier system 310 to remove the moisture form the zones 260a, 260b, 260c.

When steaming is employed in the heating step 130, the heating step 130 may be performed in a kiln in which live steam is injected into the kiln bed. In such embodiments, the steam is injected at a temperature of 170° F. to 175° F. at a pressure of 34 psi to 40 psi, and the kiln is maintained at a temperature of 170° F. to 175° F. The steaming process takes place over a time period of from 3.0 to 4.0 hours, more particularly from 3.0 to 3.5 hours. The relative humidity in the kiln during steaming is 95-100%, more particularly 100%. During steaming, the moisture content of the wet green malt is reduced to, e.g., 3.5 to 5.0% by weight, more particular, to 4.0 to 4.5% by weight.

Referring back to FIG. 1, in embodiments, the green malt undergoes a step of cooling 140 after heating 130 to allow the saccharified sugars inside the kernel to form a crystal structure. In embodiments, the heated malt is cooled to a temperature of 40° C. to 50° C. In embodiments, the heated malt can be cooled by leaving the heated malt in ambient conditions. In other embodiments, the heated malt can be cooled using forced air or refrigeration to speed the cooling process.

After the crystal structure is allowed to form, the green malt undergoes drying 150 after heating 130 and cooling 140 to further reduce the moisture content of the green malt. During drying 150, the moisture content of the green malt is reduced to about 3.0%-6.0% by weight, more particularly to 3.5%-5.0% by weight. In embodiments, drying 150 takes place at a temperature in the range of 65° C. to 140° C. for a time of 2 hours to 20 hours, more particularly 2 hours to 4 hours. In embodiments, the step of drying 150 may be performed in a kiln. Further, in the case of steaming for heating 130, the drying/kilning step may be performed as part of the steaming process. That is, heating 130 and drying 150 may be combined into a single step. However, in such a case, a separate drying/kilning may still be performed to achieve a desired color of the malt. For example, in embodiments, the malt may be kilned at 60° C. for up to 24 hours to achieve a color of 1.5-2.0 SRM.

In a conventional malting process, the green malt proceeds directly from germinating to drying or roasting without the presently disclosed heating step 130. Drying in a kiln will produce a regular malt, i.e., not a crystal malt, and drying via roasting according to the conventional process is only able to produce grains having crystallization rates of about 50% to 60%. Utilizing the presently disclosed heating step 130, the crystallization of the green malt increases to at least 85%, typically above 90%, more typically above 95%, and even up to 100%.

One ancillary advantage to the heating step 130 is that the time required for kiln drying 140 is substantially reduced. As mentioned, the heating step 130 may reduce the moisture content of the green malt to about 15%-18% when microwaving is used, and thus, kiln drying 140 only needs to further reduce the moisture content from 15%-18% to 3.0-6.0%. After kiln drying 140, the grain undergoes a cleaning step 160 to remove sprouts and roots. The cleaned grain is then binned, blended, and packaged for shipping.

EXPERIMENTAL

Eight test samples were prepared according to the presently disclosed method. The grain samples used were barley of the variety Australia-Compass. The samples were provided in the green (i.e., germinated) state, and the initial moisture content of the grain samples was 40%. The eight samples underwent the microwaving step in a microwave tunnel using microwaves at a frequency of 2450 MHz and an operational power of 42 kW. The microwave tunnel had a length of 11.35 m and a width of 0.85 m. The eight samples were conveyed through the microwave tunnel at different speeds (Hz) and for different lengths of time. Of the eight samples, four underwent two microwave runs, while the other four only underwent a single microwave run. The specifics of the microwave run(s) for each sample are provided in Table 1, below.

TABLE 1

Summary of Microwaving Parameters for Samples 1-8

| | Trial No. | 1 | 2 | 3 | 4 | 5 | 6 | 7 | 8 |
|---|---|---|---|---|---|---|---|---|---|
| First run | Conveyor Motor Speed (Hz) | 18 | 15 | 11 | 11 | 13 | 30 | 45 | 37 |
| | Treatment Time (min) | 16 | 17 | 32 | 23 | 16 | 9.7 | 5.5 | 3.9 |
| | Moisture content (%) | 20 | 15.5 | 12.7 | 18 | 22.4 | 18 | 21 | 23 |
| Second run | Conveyor Motor Speed (Hz) | 18 | 15 | n/a | n/a | n/a | 30 | 50 | n/a |
| | Treatment Time (min) | 13.5 | 10 | n/a | n/a | n/a | 8.5 | 5.4 | n/a |
| | Moisture content (%) | 7.6 | 5.5 | n/a | n/a | n/a | 5.8 | 6.2 | n/a |

The crystallization of Samples 1-8 was measured. Measurement of crystallization rate is performed by splitting a random sampling of 100 malted grains (husk and kernel) in half and observing the interior structure. The interior structure is classified as crystal, semi-crystal, or flour. "Crystal" means that the starch has fully saccharified, and "semi-crystal" means that the starch has not fully saccharified. "Flour" means that the starch has not saccharified.

Figure 3:
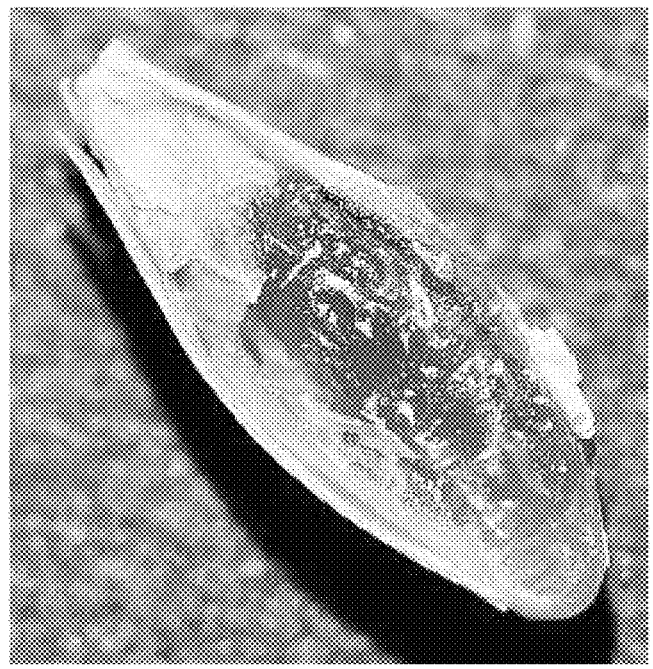
FIG. 3 depicts a kernel of a barley grain that has been crystallized according to an embodiment of the presently disclosed method.
Figure 4:
FIG. 4 depicts kernel of a malted barley grain after kiln drying.

FIG. 3 depicts a crystal kernel produced via the microwaving step described. As can be seen in FIG. 3, the entire kernel of the grain has been converted to sugar. By comparison, FIG. 4 depicts a malted grain having a flour kernel produced by a process in which the green malt proceeded to kiln drying without any microwaving. A semi-crystal kernel will have a kernel between that of the crystal kernel of FIG. 3 and the flour kernel of FIG. 4. In general, in a semi-crystal kernel, the crystallization will begin at one or both ends of the kernel and will end somewhere between the ends, such that there is a region of crystallization and a region of flour.

In embodiments, a kernel may be considered "crystal" if at least 90% of the kernel has crystallized, and a kernel may be considered "flour" if no more than 10% of the kernel has crystallized. Between 10% and 90% crystallization may be considered "semi-crystal" in embodiments.

Upon visual inspection of the 100 malted grains, the number of grains of each type are counted, and the crystallization rate is the percentage (number) out of 100 that are crystal. The measured crystallization rate for each of Samples 1-8 is provided in Table 2, below. Table 2 also includes the measured crystallization for three commercially-available comparative examples. CE1 and CE2 are roasted crystal malts, and CE3 was produced through steamed saccharification. CE1, CE2, and CE3 did not undergo any microwaving.

TABLE 2

Measured Crystallinity of Microwaved Samples and Comparative Examples

| Sample | Crystal (%) | Semicrystal (%) | Flour (%) |
|---|---|---|---|
| CE1 | 50 | 34 | 16 |
| CE2 | 60 | 22 | 18 |
| CE3 | 98 | 1 | 1 |
| Sample 1 | 99 | 1 | 0 |
| Sample 2 | 99 | 1 | 0 |
| Sample 3 | 96 | 4 | 0' |
| Sample 4 | 100 | 0 | 0 |
| Sample 5 | 100 | 0 | 0 |
| Sample 6 | 99 | 1 | 0 |
| Sample 7 | 99 | 1 | 0 |
| Sample 8 | 99 | 1 | 0 |

As can be seen in Table 2, the crystallization rate for each of Samples 1-8 was above 96%, whereas CE1 and CE2, which were produced via roasting, have much lower crystallization rates of 50% and 60%, respectively. Further, none of Samples 1-8 contained any remaining flour kernels, whereas CE1, CE2, and CE3 contained flour. CE1 and CE2, in particular, had significant proportions of flour kernels (16% and 18%, respectively).

The malted grains were also analyzed for various properties associated with brewing. The measured brewing properties are summarized in Table 3, below.

TABLE 3

Crystal Malt Analysis

| Trial No. | 1 | 2 | 3 | 4 | 5 | 6 | 7 | 8 | CE1 | CE2 | CE3 |
|---|---|---|---|---|---|---|---|---|---|---|---|
| Moisture | 4.2 | 7.3 | 4.7 | 5.5 | 5.6 | 6.3 | 5.9 | 5.6 | 7.1 | 5.9 | 4.9 |
| Total Protein | 10.6 | 10.9 | 10.8 | 10.6 | 10.7 | 10.8 | 11.1 | 10.9 | 11.8 | 11.9 | 11.7 |
| FGDB | 79.5 | 79.4 | 79.5 | 80.0 | 80.2 | 80.4 | 79.9 | 80.0 | 81.9 | 83.3 | 80.5 |
| Color (SRM) | 13.56 | 9.9 | 11.59 | 10.99 | 12.79 | 12.39 | 18.19 | 31.19 | 40.82 | 33.02 | 45.82 |
| Turbidity | 20 | 14 | 21 | 29 | 33 | 13 | 14 | 11 | 28 | 35 | 10 |
| pH | 5.88 | 5.89 | 5.89 | 5.91 | 5.93 | 5.88 | 5.86 | 5.77 | 5.64 | 5.57 | 5.94 |
| FAN | 100 | 102 | 108 | 110 | 106 | 140 | 146 | 148 | 92 | 90 | 148 |
| B-Glucan | 96 | 100 | 110 | 144 | 116 | 74 | 46 | 34 | 961 | 519 | 249 |
| Viscosity | | | | | | | | | 1.74 | 1.62 | 1.55 |
| Soluble Protein | 3.94 | 3.44 | 4.14 | 4.04 | 3.96 | 4.26 | 4.72 | 5.58 | 4.47 | 6.09 | 4.47 |
| S/T | 37.2 | 31.6 | 38.3 | 38.1 | 37.0 | 39.4 | 42.5 | 51.2 | 37.9 | 51.2 | 38.2 |

In Table 3, "FGDB" means "Fine Grind, Dry Basis," which is a measure of how much extract is produced when the malt is milled very finely and mashed in a laboratory setting. "FAN" refers to "Free Amino Nitrogen," which is a measure of the amount of free amino nitrogen available in malt/wort that is important for yeast growth during fermentation. Turbidity, in general, is a measure of the light scattering properties of a liquid resulting from suspended solid materials. In Table 3, turbidity specifically refers to the measure of nephelometric turbidity units (NTU) in the wort form when malt is milled and mashed into wort. "S/T" is the ration of soluble protein to total protein multiplied by 100. Two parameters in particular provide a stark differentiation between Samples 1-8 and CE1 and CE2. The first parameter is color, which was measured according to the official ASBC method. Samples 1-8 had colors in the range of 9.19-31.19 SRM, whereas CE1 and CE2 had colors in the range of 33.02-45.82. Color is the main quality parameter for crystal malt as it is significantly related to the malt flavor profile. The second parameter is beta-glucan. Samples 1-8 all had relatively low beta-glucan levels in the range of 34-114 ppm, whereas CE1 and CE2 had beta-glucan levels in the range of 249-961 ppm. High beta-glucan in the malted grain can cause high viscosity, lautering, poor extract, and haze formation during brewing. Low beta-glucan is associated with higher cell wall modification and a more friable kernel.

Flavor profiles were also developed for Samples 1-8 and CE3. Each flavor profile is depicted as a spider graph in FIGS. 5A-5H. The flavor profiles were prepared by MENA's Lab, which is Applicant's malt analysis laboratory in Great Falls, Mont. The flavor profiles were developed in the Congress wort format, and Table 4, below, provides the mean values for the scores recorded by 5 testers. For each flavor in the base flavor map, the samples were tested on a scale of 0 to 5. In terms of industry standard scale, "0" indicates that the particular flavor is not at all recognized; "1" indicates that the flavor is just recognized; "2" indicates that the flavor is slightly recognized; "3" indicates moderate recognition of the flavor; "4" indicates strong recognition of the flavor; and "5" indicates extremely strong recognition of the flavor.

Figure 5B:
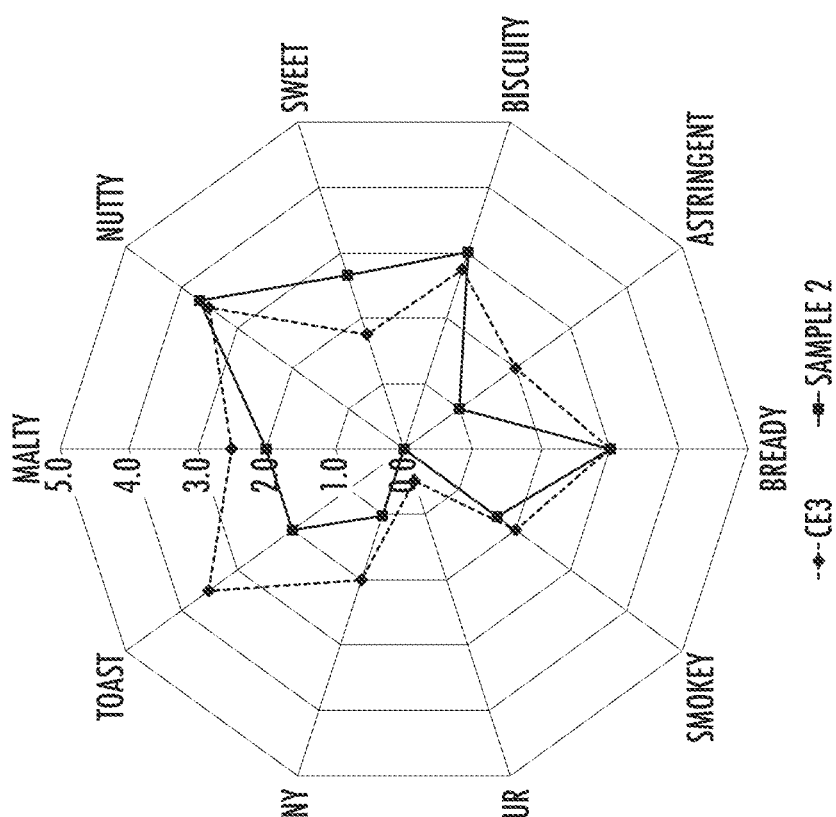
FIGS. 5A-5H depict flavor profiles for samples of malted barley produced according to an embodiment of the presently disclosed method.
Figure 5A:
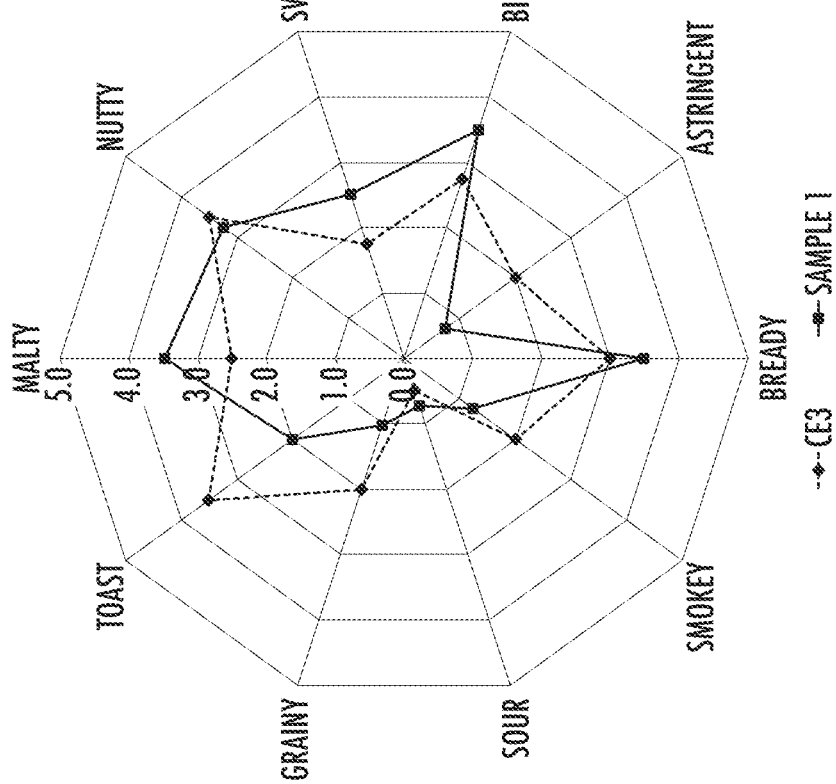
Figure 5D:
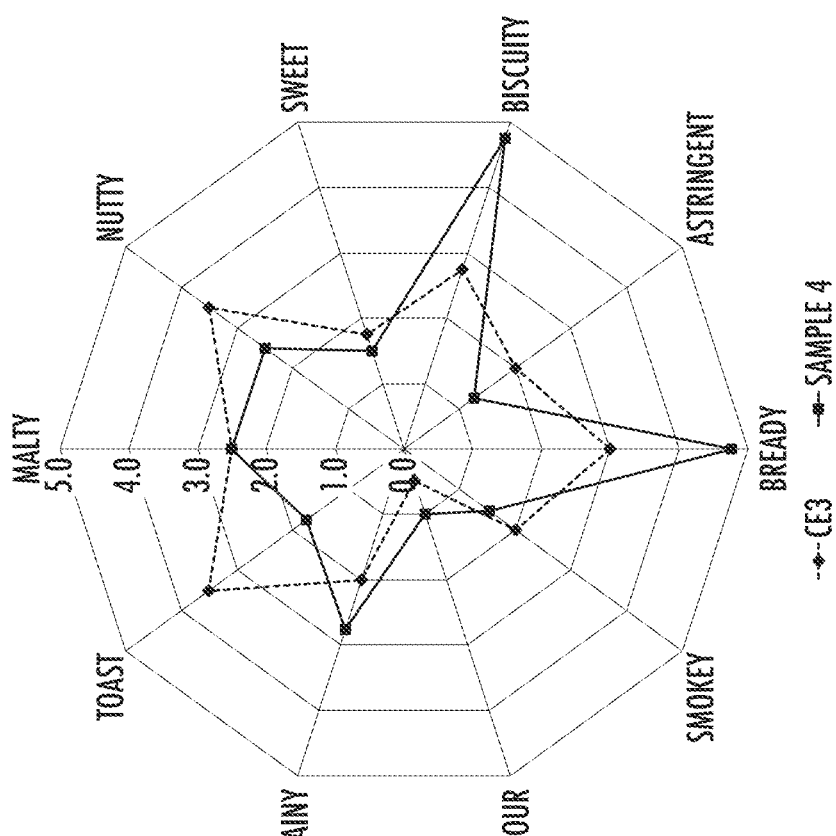
Figure 5C:
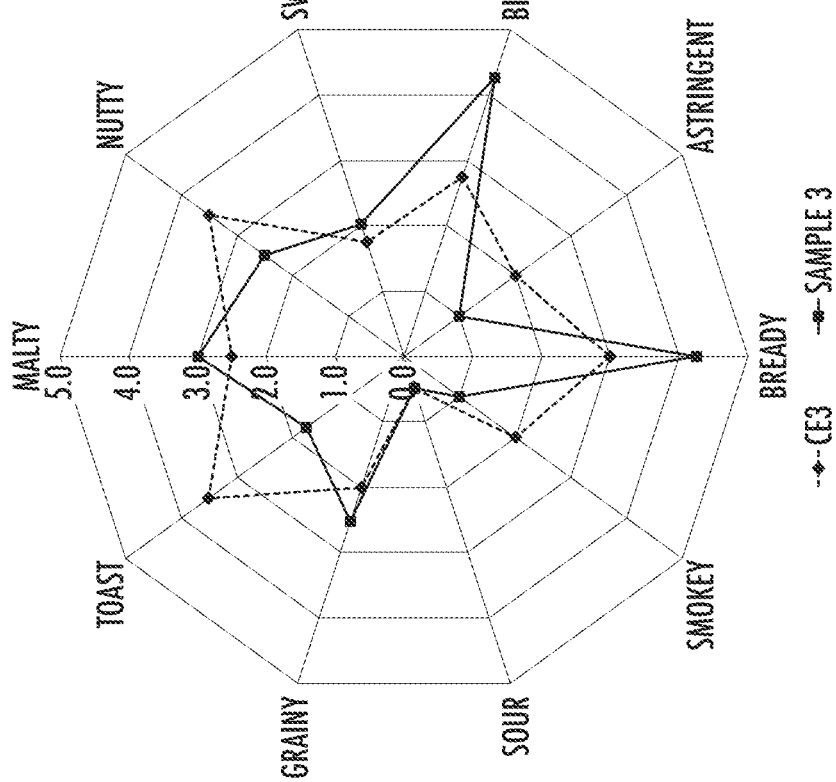
Figure 5F:
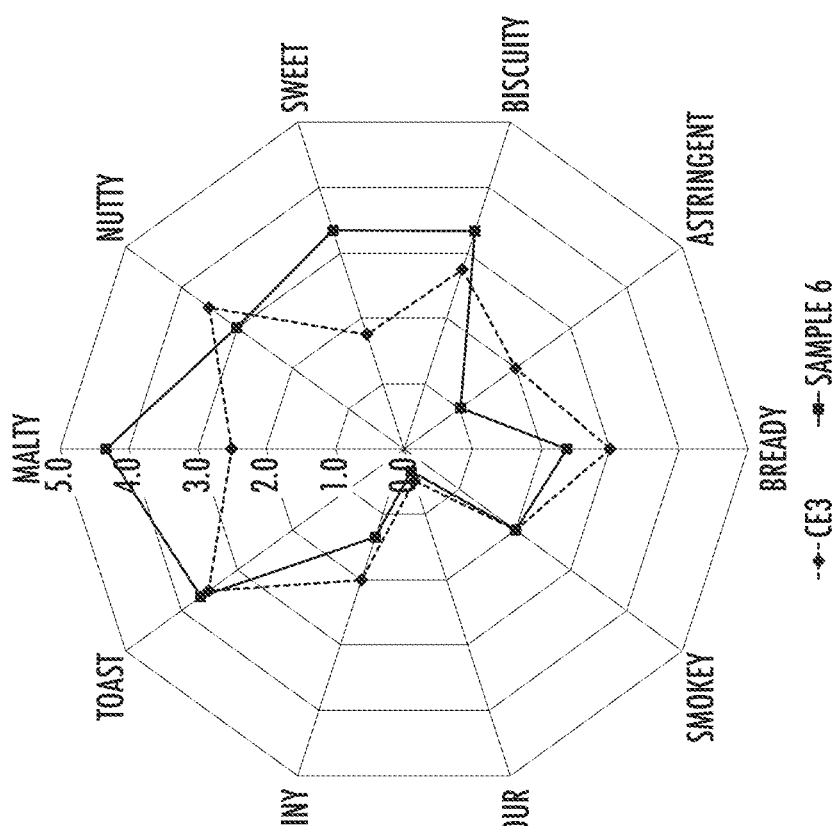
Figure 5E:
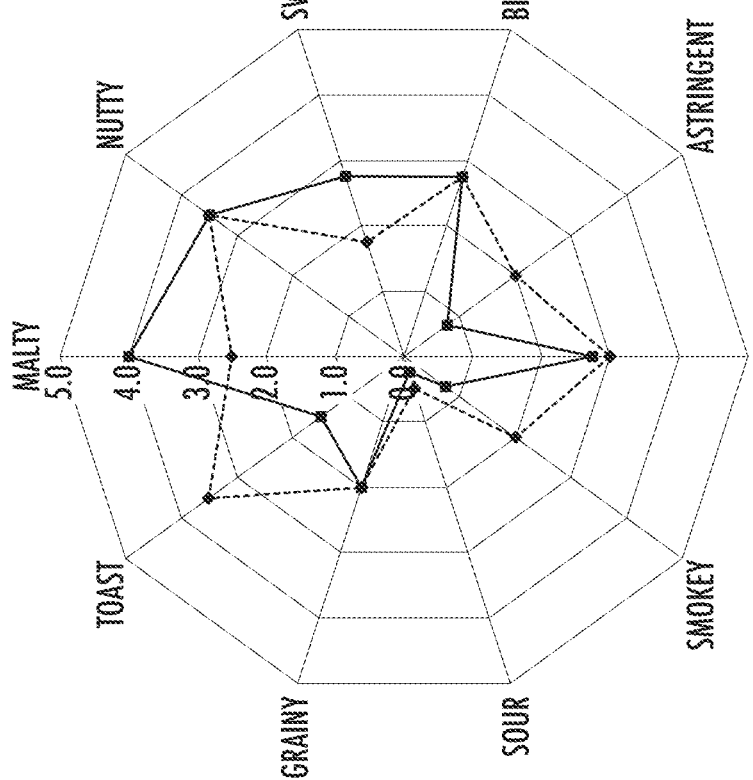
Figure 5H:
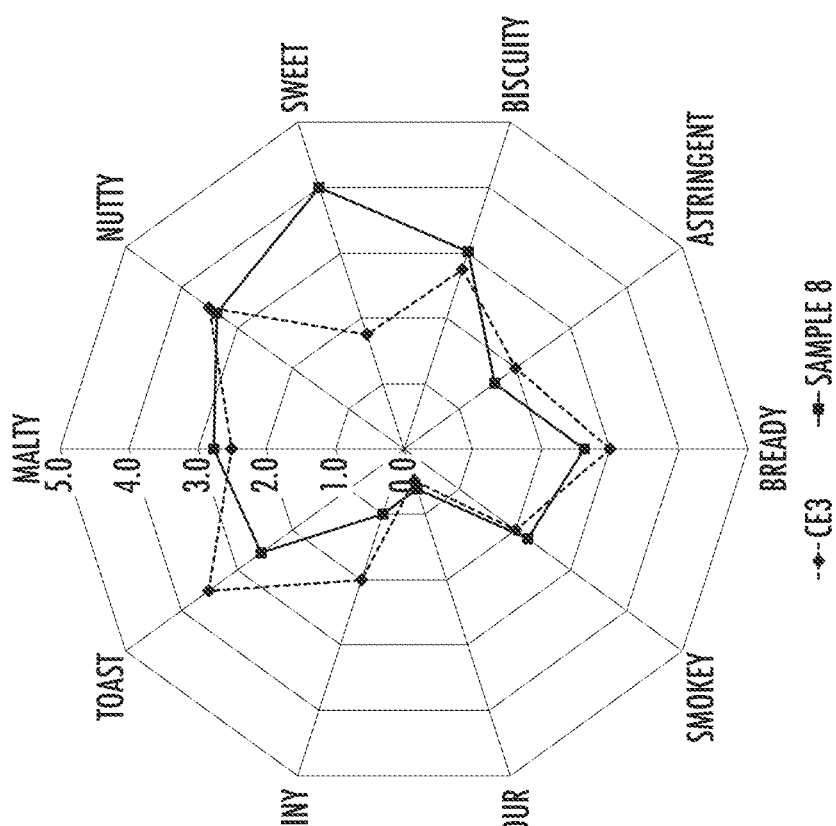
Figure 5G:
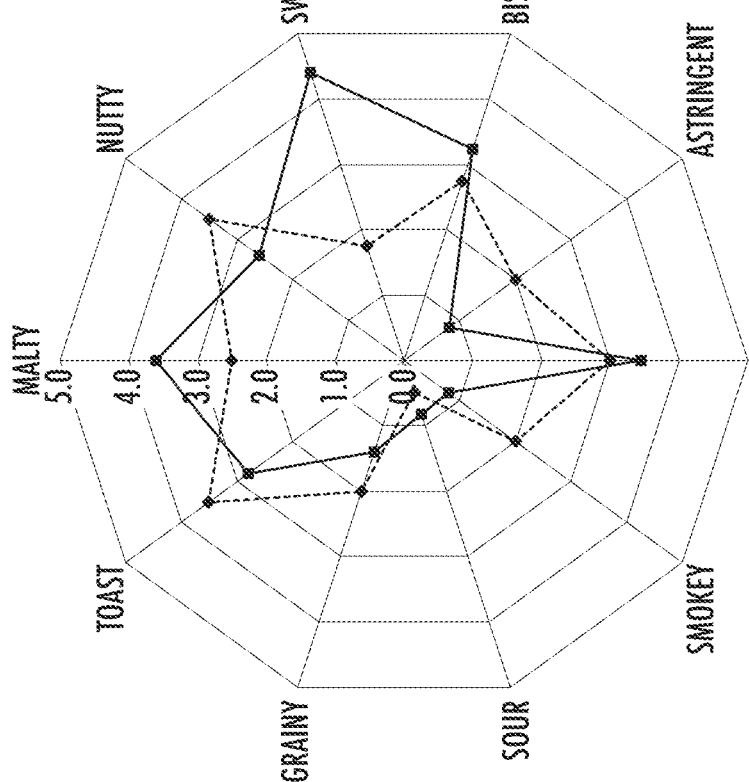

In each of the flavor profiles shown in FIGS. 5A-5H, one of Samples 1-8 is compared to CE3. As can be seen in each figure, each of Samples 1-8 has at least one flavor of malty, sweet, biscuity, or bready that exceeds the corresponding flavor of CE3. In particular, as can be seen in FIGS. 5C and 5D, Samples 3 and 4 developed high biscuit and bready flavors, scoring 4.3 and 4.8 in each of biscuity and bready flavor, respectively. As can be seen in FIGS. 5E and 5F, Samples 5 and 6 scored high in malty flavor with scores of 4.0 and 4.3, respectively. As can be seen in FIGS. 5G and 5H, Samples 7 and 8 scored high in sweet flavor with scores of 4.4 and 4.0, respectively. Without wishing to be bound by theory, Applicant believes that the unique flavor profiles of the crystal malt produced using a microwaving step is the result of different Maillard and caramelization reactions than what typically occur in a malt that is only kiln dried. In particular, it is believed that the different reactions result in different pyrazine, pyridine, maltol, furaneol, and ethanone compounds.

TABLE 4

Malt Flavor Sensory Scoring

|          | Malty | Nutty | Sweet | Biscuity | Astringent | Bready | Smokey | Sour | Grainy | Toast |
|----------|-------|-------|-------|----------|------------|--------|--------|------|--------|-------|
| CE3      | 2.5   | 3.5   | 1.8   | 2.8      | 2.0        | 3.0    | 2.0    | 0.5  | 2.0    | 3.5   |
| Sample 1 | 3.5   | 3.3   | 2.5   | 3.5      | 0.8        | 3.5    | 1.3    | 0.8  | 1.0    | 2.0   |
| Sample 2 | 2.0   | 3.7   | 2.7   | 3.0      | 1.0        | 3.0    | 1.7    | 0.0  | 1.0    | 2.0   |
| Sample 3 | 3.0   | 2.5   | 2.0   | 4.3      | 1.0        | 4.3    | 1.0    | 0.5  | 2.5    | 1.8   |
| Sample 4 | 2.5   | 2.5   | 1.5   | 4.8      | 1.3        | 4.8    | 1.5    | 1.0  | 2.8    | 1.8   |
| Sample 5 | 4.0   | 3.5   | 2.8   | 2.8      | 0.8        | 2.8    | 0.8    | 0.3  | 2.0    | 1.5   |
| Sample 6 | 4.3   | 3.0   | 3.3   | 3.3      | 1.0        | 2.3    | 2.0    | 0.3  | 1.3    | 3.7   |
| Sample 7 | 3.6   | 2.6   | 4.4   | 3.2      | 0.8        | 3.4    | 0.8    | 0.8  | 1.4    | 2.8   |
| Sample 8 | 2.8   | 3.4   | 4.0   | 3.0      | 1.6        | 2.6    | 2.2    | 0.6  | 1.0    | 2.6   |

Samples 4, 6, and 8 were also tested for the presence of 4-methylimidazole (4-MeI). 4-MeI is present in many foods and beverages and may be formed when browning certain foods. In particular, it is thought to be a product of Maillard reactions between carbohydrates and amino-containing compounds. In particular, 4-MeI has been found in roasted foods, coffee, grilled meats, and types of caramel coloring produced with ammonia-based processes. 4-MeI has gained greater attention because of its potential carcinogenic activity. The European Commission has specified legal limits of 200 mg/kg for 4-MeI for Class III caramel. The State of California has added 4-MeI to its list of probably carcinogens and stipulated 29 µg/day as the "No Significant Risk Level" for intake.

Table 5, below, provides the measured 4-MeI contents of CE1, CE2, and CE3 along with Samples 4, 6, and 8. The 4-MeI content was determined using liquid chromatography-mass spectrometry (LC-MS). As can be seen in Table 5, CE1 and CE2 both contained 50 ppb of 4-MeI. Applicants believe that the roasting of the malt is what causes the 4-Met CE3, which is produced by steaming instead of roasting, did not contain any detectable levels of 4-MeI. Samples 4, 6, and 8 also did not contain any detectable level of 4-MeI.

TABLE 5

Content of 4-MeI in Tested Samples

|          | 4-MeI Level (ppb) |
|----------|-------------------|
| CE1      | 50                |
| CE2      | 50                |
| CE3      | Not detected      |
| Sample 4 | Not detected      |
| Sample 6 | Not detected      |
| Sample 8 | Not detected      |

Figure 6:
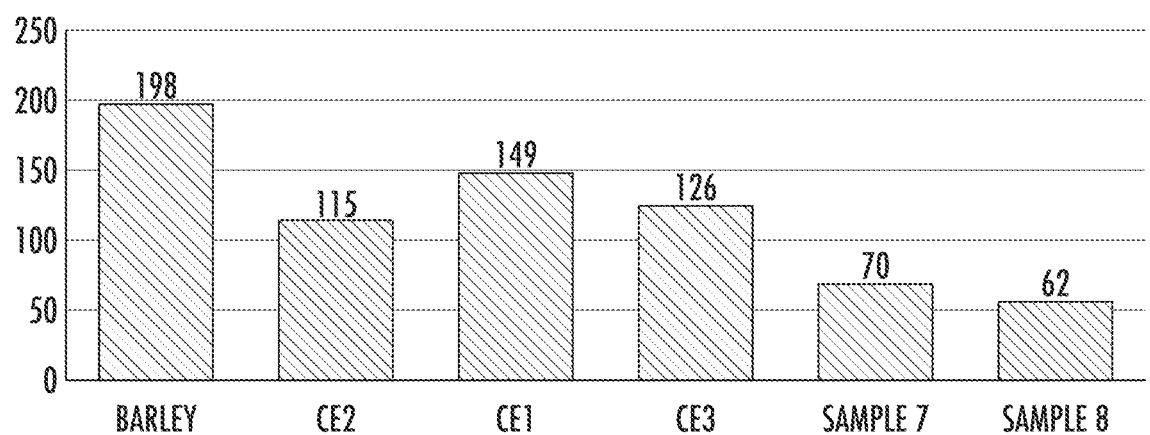
FIG. 6 depicts a graph of hardness measurements for a variety of grains, including grains produced according to an embodiment of the presently disclosed method.

Grains of the crystal malt were also measured for their grain hardness according to SKCS (Single Kernal Characterization System) 4100. In particular, Samples 7 and 8 were analyzed against an uncrystallized barley grain, CE1, CE2, and CE3. For each hardness measurement, 100 grains were tested, and the hardness value is the average for those 100 grains. FIG. 6 provides a graph of the results. As can be seen, the uncrystallized barley grain had the highest hardness of 198. Each of CE2, CE1, and CE3 had a hardness well above 100, and Samples 7 and 8 had grain hardnesses of 70 and 62, respectively. The crystal malts all have hardnesses lower than the barley grain because of the deterioration of the cell wall as part of the crystallization process. The crystal malts produced according to the present disclosure have a lower hardness that is believed to result in part from the difference between the crystallization methods. In particular, during microwaving, the malted grain is cooked from the inside-out, enhancing the crystallization rate, whereas during roasting and steaming, the malted grain is cooked from the outside-in. In this way, the grains are, on average, softer than the conventional crystal malts because a much higher percentage of grains are crystal (i.e., having fully converted starches).

The crystal malt described herein provides several advantages over commercially available crystal malt. Chiefly, the presently disclosed crystal malt has a much higher crystallization rate of at least 90%. Indeed, Samples 1-8 all have crystallization rates in the range of 96-100%. Conventional crystal malts have a crystallization rate of 50%-60%. Further, the crystal malts made according to the presently disclosed microwaving process do not contain detectable levels of 4-MeI. Additionally, the crystal malt made according to the present disclosure exhibits a unique flavor profile with an emphasis on malty, sweet, biscuity, and bready flavors. Still further, as discussed above, the microwaving process provides the ancillary benefit of reducing the energy costs associated with the process of producing crystal malts. Yet another advantage to the crystal malts disclosed herein is the low beta-glucan levels of less than 200 ppm, which allows a brewer to mill crystal malt, increase extract, and avoid lautering issues. Further still, the crystal malts produced according to the present disclosure are easier to chew and eat than currently available crystal malt products.

According to another embodiment shown in FIG. 7, the crystal malt is produced via a method 400 in which the grain is steeped and kiln-dried twice. As will be described, the grain undergoes a malting process before it is re-steeped, heated, and kiln-dried. Thus, with reference to FIG. 7, the method 400 begins with a first step of steeping 410 the grain. As with the previous embodiment, the grain may be any of a variety of maltable grains, such as barley, wheat, corn, rice, rye, or oat, among others. During the first step of steeping 410, the grain is soaked in a vat with water for about 30 to 40 hours. As with the previous embodiment, chaff and other waste materials may be removed from the vat at this time. After the first steeping 410, the grain proceeds to a step of germinating 420 for, e.g., approximately 4 days to produce green malt having a moisture content of between 40% and 50% by weight, more particularly between 45% and 48% by weight. Thereafter, according to this embodiment of the method 400, the green malt undergoes a first drying step 430 to reduce the moisture content to about 3.0% to 7.0% by weight, in particular about 3.5%-6.0% by weight. In embodiments, the first drying 430 takes place at a temperature in the range of 55° C. to 95° C. for a time of 15 hours to 30 hours, more particularly 18 hours to 24 hours. In embodiments, the first step of drying 430 may be performed in a kiln. Thereafter, the malted grain may undergo a cleaning step 440 to remove any remaining sprouts and roots. However, the cleaning step 440 may occur at the end of the method 400 instead of after the first drying step 430, or the malted grain may undergo another cleaning in addition to the cleaning step 440.

According to method 400, the malted grain after the first drying step 430 undergoes a second step of steeping 450 (i.e., a re-steeping step). During the second steeping 450, the malted grain is soaked in a vat of water for an additional 10 to 20 hours to rehydrate the grain to a moisture content of 40% to 50% by weight. The re-steeped malted grain then undergoes a step of heating 460. According to embodiments disclosed herein, the step of heating 460 may comprise at least one of steaming or microwaving the re-steeped malted grain, which further saccharifies the malted grain to achieve a crystallization rate of at least 85%, typically above 90%, more typically above 95%, and even up to 100%. Microwaving 460 also reduces the moisture content of the malted grain to, e.g., 20% to 38% by weight, more particularly to 25% to 35% by weight. When microwaving is employed in the heating step 460, the heating step 460 may be performed using a microwave tunnel as described above with respect to FIG. 2.

When steaming is employed in the heating step 460, the heating step 460 may be performed in a kiln in which live steam is injected into the kiln bed. In such embodiments, the steam is injected at a temperature of 170° F. to 175° F. at a pressure of 34 psi to 40 psi, and the kiln is maintained at a temperature of 170° F. to 175° F. The steaming process takes place over a time period of from 3.0 to 4.0 hours, more particularly from 3.0 to 3.5 hours. The relative humidity in the kiln during steaming is 95-100%, more particularly 100%. During steaming, the moisture content of the malted grain is reduced to, e.g., 3.5 to 5.0% by weight, more particular, to 4.0 to 4.5% by weight.

In the method 400, the heated malt may optionally undergo a step of cooling 470 after heating 460 to allow the saccharified sugars inside the grains to form a crystal structure. In embodiments, the heated malt is cooled to a temperature of 40° C. to 50° C. In embodiments, the heated malt can be cooled by leaving the heated malt in ambient conditions. In other embodiments, the heated malt can be cooled using forced air or refrigeration to speed the cooling process.

After the crystal structure is allowed to form, the heated malt may undergo a second drying 480 to further reduce the moisture content of the heated malt. During the second drying 480, the moisture content of the malt may be reduced, especially after heating by microwaving, to about 3.0%-6.0% by weight, more particularly to 3.5%-5.0% by weight. As with the first drying step 430, the second drying 480 may take place at a temperature in the range of 55° C. to 140° C. for a time of 2 hours to 24 hours, more particularly 4 hours to 8 hours. In embodiments, the second step of drying 480 may also be performed in a kiln. Further, in the case of steaming, the drying/kilning step may be performed as part of the steaming process. That is, the heating step 460 and second drying step 480 may be combined into a single step. In such a case, a separate drying/kilning may still be performed to achieve a desired color of the malt. For example, in embodiments, the malt may be kilned at 60° C. for up to 24 hours to achieve a color of 1.5-2.0 SRM. As mentioned above, if a cleaning step 440 has not been performed or if another cleaning step is desired, the crystal malt may be cleaned, and then the crystal malt may be binned, blended, and packaged for shipping.

The method 400 describes the entire process of producing an initial malt as part of the overall process of preparing the crystal malt according to the present disclosure. However, the method 400 may be simply described by the steps of providing a malted grain 490, steeping the malted grain 450, heating the malted grain 460, optionally cooling the malted grain 470, and drying the malted grain 480. That is, a crystal malt producer may purchase commercially available malt as the input for producing the crystal malt according to the present disclosure instead of malting a grain prior to the steps involved in producing the crystal malt.

The crystal malt produced according to the method 400 is similar in flavor profile to the crystal malt produced according to the method 100. However, the crystal malt of method 400 has more intense flavors. Thus, for example, the flavor profiles depicted in FIGS. 5A-5H would exhibit higher sensory scores for some or all of the flavors. Additionally, the crystal malt produced via method 400 is crispier in texture than the crystal malt produced via method 100, and the crystal malt produced via method 400 is believed to have extensive food applications, e.g., for making flours, cereals, malt syrup, malt extract, cookies, biscuits, bread, etc., as well as use in brewing. Advantageously, the crystal malt produced via method 400 also does not have detectable levels of 4-MeI.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A process of producing crystal malt, comprising the steps of:
   providing a batch of germinated malt having a first moisture content;
   microwaving the batch of germinated malt such that at least 85% of the batch of germinated malt saccharifies, wherein during microwaving, the first moisture content is reduced to a second moisture content.

2. The process of claim 1, wherein the first moisture content is from 40% to 50% by weight and the second moisture content is from 15% to 25% by weight.

3. The process of claim 2, further comprising the step of drying the batch of germinated malt so as to reduce the second moisture content to a third moisture content.

4. The process of claim 3, wherein the step of drying is performed at a temperature of 65° C. to 140° C. for a period of 2 hours to 20 hours.

5. The process of claim 3, wherein the third moisture content is from 3.0% to 6.0% by weight.

6. The process of claim 1, wherein the step of microwaving is performed for a time of 2 minutes to 20 minutes.

7. The process of claim 1, wherein, during the step of microwaving, the batch of germinated malt reaches a temperature of 65° C. to 68° C.

8. The process of claim 1, further comprising a step of cooling the batch of germinated malt after microwaving to allow the saccharified batch of germinated malt to crystallize.

9. The process of claim 1, wherein, upon completion of the step of microwaving, at least 95% of the batch of germinated malt saccharifies.

10. The process of claim 1, wherein, after microwaving, the saccharified batch of germinated malt contains less than 50 ppb of 4-methylimidazole.

11. The process of claim 1, wherein, after microwaving, the saccharified batch of germinated malt produces a wort having a beta-glucan level of at most 200 ppm.

12. The process of claim 1, wherein, after microwaving, the saccharified batch of germinated malt produces a wort having a color in the range of 5 to 32 Standard Reference Method.

13. The process of claim 1, wherein, after microwaving, the saccharified batch of germinated malt has, on average, a single grain hardness of at most 100 as measured according to Single Kernel Characterization System 4100.

14. A batch of crystal malt, comprising:
    at least 90% crystallized malt kernels; and
    wherein the batch of crystal malt contains less than 50 ppb of 4-methylimidazole (4-MeI).

15. The batch of crystal malt of claim 14, wherein for a flavor profile considering flavors of malty, nutty, sweet, biscuity, astringent, bready, smokey, sour, grainy, and toast, the most noticeable flavor is at least one of malty, sweet, bready, or biscuity.

16. The batch of crystal malt of claim 14, wherein the crystal malt is produced from a variety of barley.

17. A method of producing crystal malt, comprising the steps of:
    providing a batch of malted grain;
    steeping the batch of malted grain, wherein the steeped batch of malted grain has a first moisture content;
    heating the batch of malted grain such that at least 85% of the batch of malted grain saccharifies, wherein during heating, the first moisture content is reduced to a second moisture content.

18. The method of claim 17, wherein the step of heating comprises microwaving the batch of malted grain.

19. The method of claim 18, wherein the step of heating comprises steaming the batch of malted grain.

20. The method of claim 19, wherein steaming is performed in a kiln and comprises injecting live steam having a temperature of 170° F. to 175° F. and a pressure of 35 psi to 40 psi into a bed of the kiln.

21. The method of claim 17, wherein the step of providing a batch of malted grain comprises:
    steeping a batch of grain;
    germinating the batch of grain;
    drying the batch of grain.

22. The method of claim 17, further comprising the step of drying the batch of malted grain after the step of heating, wherein the step of drying further reduces the second moisture continent to a third moisture content.

23. The method of claim 22, wherein the step of drying takes place at 55° C. to 140° C. for a time of 2 hours to 24 hours.

24. A process of producing crystal malt, comprising the steps of:
    providing a batch comprising germinated malt or malted grain having a first moisture content;
    heating the batch such that at least 85% of the batch saccharifies, wherein during heating, the first moisture content is reduced to a second moisture content.

25. The process of claim 24, wherein the batch comprises germinated malt and wherein the first moisture content is from 40% to 50% by weight; and
    wherein the step of heating comprises steaming the batch of malted grain, wherein the second moisture content is 3.5 to 5.0% by weight.

26. The process of claim 24, wherein the batch comprises malted grain and wherein the process further comprises steeping the batch of malted grain before heating to provide the first moisture content.

27. The process of claim 26, wherein, prior to the step of steeping the batch of malted grain, the step of providing the batch comprises:
    steeping a batch of grain;
    germinating the batch of grain; and
    drying the batch of grain.

28. The process of claim 26, wherein the step of heating comprises microwaving the batch of malted grain or steaming the batch of malted grain.

29. The process of claim 24, wherein the batch comprises germinated malt and wherein the first moisture content is from 40% to 50% by weight;
    wherein the step of heating comprises microwaving the batch and wherein the second moisture content is from 15% to 25% by weight; and
    further comprising the step of drying the batch of germinated malt so as to reduce the second moisture content to a third moisture content.

* * * * *